Sept. 4, 1934.          J. R. LARSON            1,972,423
                        TRAILER HITCH
                     Filed Jan. 19, 1934        2 Sheets-Sheet 1
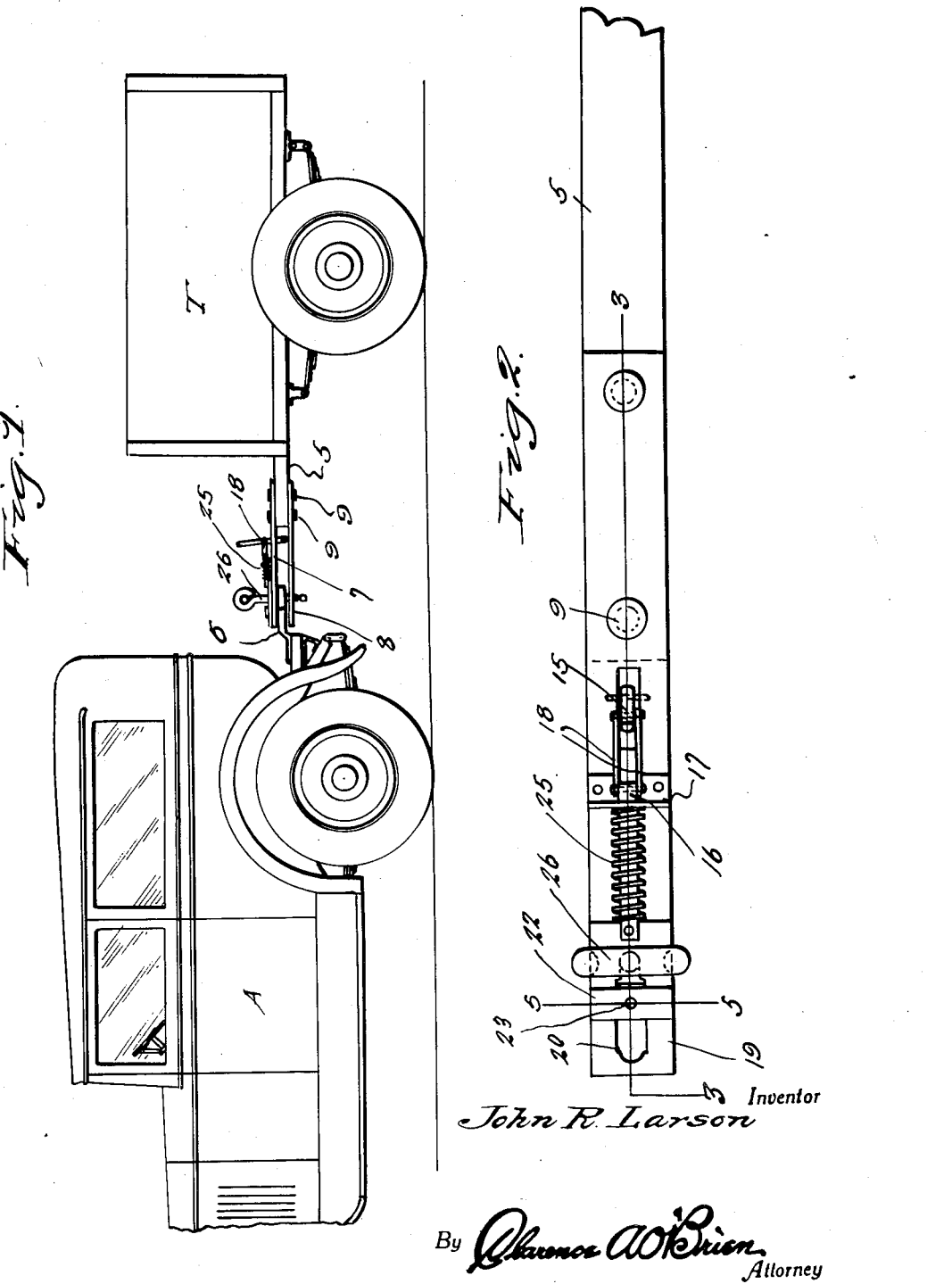
Inventor
John R. Larson
By Clarence A. O'Brien
Attorney

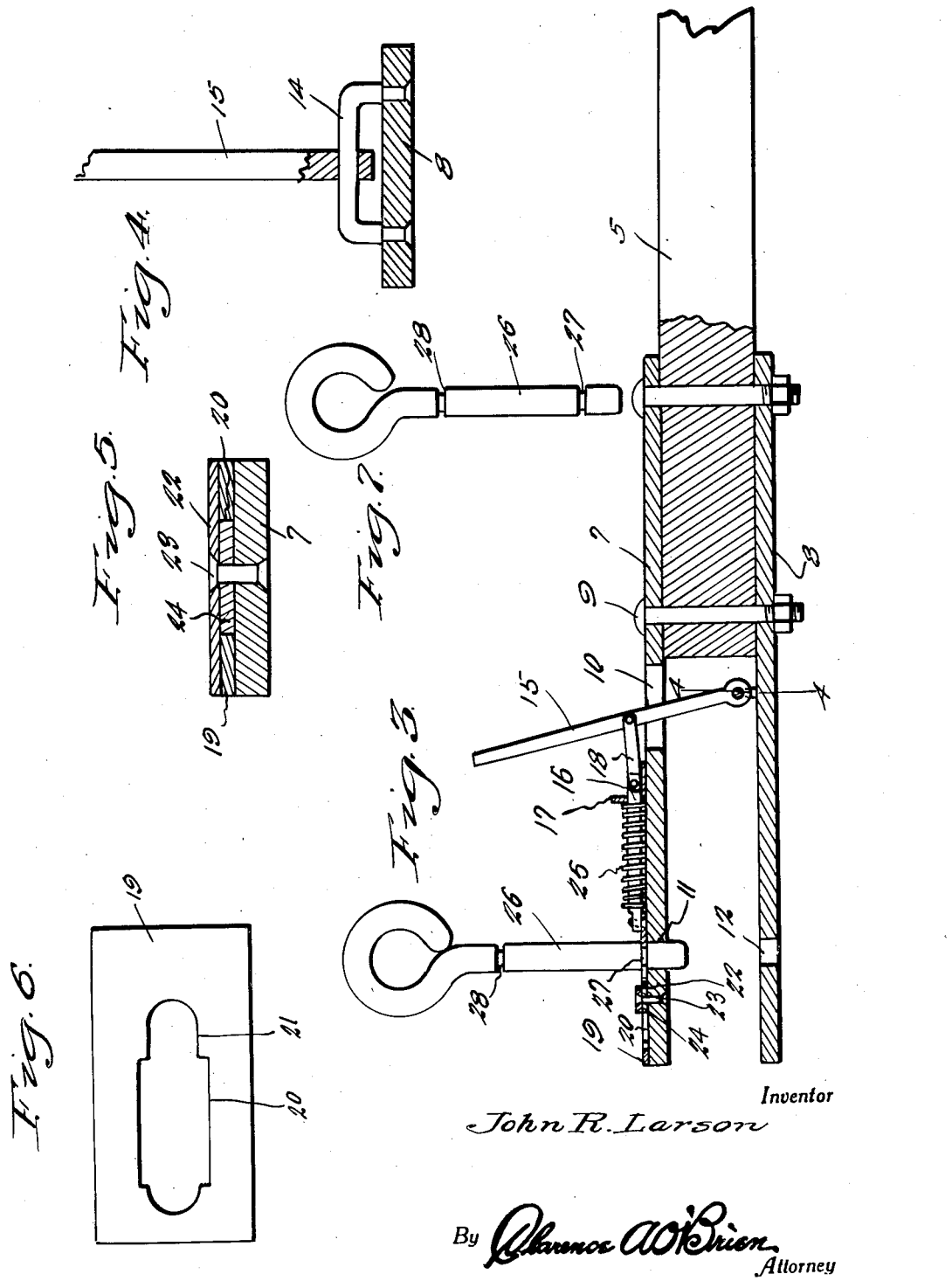

Patented Sept. 4, 1934

1,972,423

UNITED STATES PATENT OFFICE 1,972,423

TRAILER HITCH

John R. Larson, Clinton, Minn.

Application January 19, 1934, Serial No. 707,403

1 Claim. (Cl. 280—33.44)

The present invention relates to a trailer hitch and has for its object to provide a structure whereby the pin may be held locked in either open or closed position against accidental displacement and in which the construction is simple, easy to manipulate, compact, strong and durable, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a fragmentary side elevation of an automobile and a trailer showing the hitch therebetweeen.

Figure 2 is a top plan view of the hitch.

Figure 3 is a longitudinal section therethrough taken substantially on the line 3—3 of Figure 2.

Figure 4 is a detail section taken substantially on the line 4—4 of Figure 3.

Figure 5 is a detail section taken substantially on the line 5—5 of Figure 2.

Figure 6 is a top plan view of the locking plate and

Figure 7 is a detail elevation of the locking pin.

Referring to the drawings in detail it will be seen that the letter A denotes an automobile and the letter T a trailer. The trailer has a forwardly extending tongue 5. Attached to the automobile is a rearwardly extending eye member 6.

The hitch comprises a pair of plates 7 and 8 fixed to the forward end portion of the tongue 5 by means of bolts 9 and these plates project forwardly from the tongue in spaced coextensive parallelism. The plate 7 is provided with a slot 10 adjacent the tongue 5 and an opening 11 remote therefrom. An opening 12 is provided in the plate 8 in registry with the opening 11. A bracket 14 is fixed to the plate 8 below the slot 10 and a lever 15 has its lower end rockable on the bracket 14 and projects through the opening 10. A bolt 16 is slidable through a guide plate 17 mounted on the plate 7. A link 18 is pivotally engaged with the bolt 16 and with an intermediate portion of the lever 15. A locking plate 19 is slidable on the plate 7 and has a longitudinally extending slot 20 with a narrow end portion 21. A guide bar 22 extends across the plate 19 and is connected to the plate 7 by means of a rivet 23 about which is a spacer 24 mounted in the slot 20. A spring 25 is disposed about the bolt 16 and normally holds the plate 19 in its forwardmost position. Numeral 26 denotes a pin having a pair of annular grooves 27 and 28. These grooves are to receive the edges of the narrow portion 21 of the slot. Figure 3 shows the pin in its raised or unlocked position at which time it is prevented from accidental displacement by the locking plate 19. Now when the member 6 is disposed between the plates 7 and 8 in registry with the openings 11 and 12 the lever 15 is swung rearwardly and the pin falls down to project through the opening in the member 6 and through the opening 12 and the lever is released and the spring 25 causes the locking plate to engage the groove 28 and thus lock the pin in its locking position.

It is thought that the construction, operation, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

Means for connecting one vehicle to another comprising a tongue connected to one vehicle, a keeper member connected to the other vehicle, upper and lower plates connected with the tongue, with the tongue extending between parts of the plates and the other parts of the plates projecting beyond the tongue, the upper plate having a slot therein adjacent the tongue, a lever pivoted to the lower plate under the slot and extending through the slot, the free end parts of the plates having registering holes therein and the keeper member having a hole therein which will register with the first mentioned holes when the keeper member is located between the projecting parts of the plates, a pin passing through the two holes and the hole in the keeper member, said pin having upper and lower annular grooves therein, a plate slidably supported on the upper face of the upper plate and having an opening therein through which the pin passes, said opening having a restricted part, the walls of which engage the grooves in the pin when the pin is in certain positions, a bolt pivoted to the plate, a link connecting the bolt to the lever, a guide on the upper plate of the pair of plates and through which the bolt passes, and a spring on the bolt having one end engaging the guide and the other the latch plate for normally holding the latch plate with the walls of the restricted part of the opening therein in engagement with a groove of the pin.

JOHN R. LARSON.